United States Patent Office 3,410,677
Patented Nov. 12, 1968

3,410,677
HERBICIDAL AND DEFOLIATING COMPOSITION AND METHOD
Stanley D. Koch, Dayton, Ohio, assignor to Monsanto Research Corporation, St. Louis, Mo., a corporation of Delaware
No Drawing. Original application Oct. 1, 1964, Ser. No. 400,876, now Patent No. 3,312,711, dated Apr. 4, 1967. Divided and this application May 25, 1966, Ser. No. 552,708
9 Claims. (Cl. 71—74)

ABSTRACT OF THE DISCLOSURE

Compositions useful as defoliants and herbicides. The compositions contain an inert carrier and a toxic amount of a compound of the following formula:

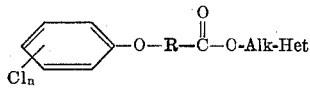

where $n$ is an integer of from 2 to 3, R and "Alk" are each saturated aliphatic hydrocarbon chains of from 1 to 6 carbon atoms and "Het" is pyridine, furan or a lower alkyl substituted pyridine or furan.

---

This is a division of application Ser. No. 400,876, filed Oct. 1, 1964, now U.S. Patent No. 3,312,711.

This invention relates to esters of aryloxy-aliphatic acids, and more particularly, to products of the reaction of aryloxy-aliphatic acylating agents with heterocyclic substituted alkyl alcohols; and to compositions and methods for the application of the said esters as defoliants.

According to the invention, there are prepared new and useful compounds which are the products of the reaction of chlorinated phenoxy monocarboxylic aliphatic acylating agents with heterocyclic substituted alkyl alcohols where the heterocyclic ring is aromatic in character, according to the scheme:

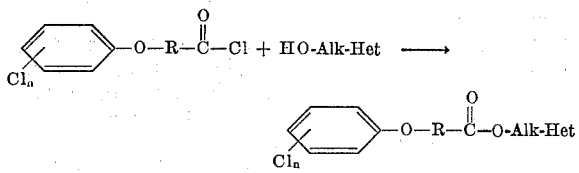

in which $n$ is an integer of from 2 to 3, R is a saturated aliphatic hydrocarbon chain (either straight or branched) containing from 1 to 6 carbon atoms, "Alk" is a saturated aliphatic hydrocarbon chain, straight or branched, of from 1 to 6 carbon atoms, and "Het" is an aromatic heterocyclic ring system consisting of from 1 to 11 ring carbon atoms, H atoms, and one ring constituent atom selected from the group consisting of oxygen and nitrogen. By an aromatic heterocyclic ring system is meant a monocyclic or fused bicyclic heterocyclic ring system containing conjugated unsaturation, and in the state of maximum unsaturation, with double bonds joining each ring atom to an adjoining atom to the maximum extent consistent with valence requirements of the ring constituents. As will be appreciated, valence requirements dictate the presence of one atom carrying an "extra" H atom in 5-membered N-heterocyclic and 6-membered O-heterocyclic systems.

The chlorinated phenoxy monocarboxylic aliphatic acid chlorides are known compounds. Examples of some useful chlorinated phenoxy monocarboxylic aliphatic acid chlorides are:

2,3-dichlorophenoxyacetyl chloride,
2,4-dichlorophenoxyacetyl chloride,
2,3,4-trichlorophenoxyacetyl chloride,
2,3,5-trichlorophenoxyacetyl chloride,
2-(2,5-dichlorophenoxy)propionyl chloride,
3-(2,6-dichlorophenoxy)propionyl chloride,
2-(3,4-dichlorophenoxy)butyryl chloride,
2-(3,5-dichlorophenoxy)butyryl chloride,
3-(2,4,5-trichlorophenoxy)propionyl chloride,
2-(2,4-dichlorophenoxy)propionyl chloride,
2-(2,3-dichlorophenoxy)butyryl chloride,
2-(2,4-dichlorophenoxy)valeryl chloride,
2-(2,3-dichlorophenoxy)butyryl chloride,
2-(2,4,5-trichlorophenoxy)-3-methylbutyryl chloride,
2-(3,4-dichlorophenoxy)valeryl chloride,
2-(2,3,4-trichlorophenoxy)valeryl chloride,
2-(3,5-dichlorophenoxy)-4-methylvaleryl chloride,
2-(2,3,5-trichlorophenoxy)-3-methylvaleryl chloride,
2-(2,3-dichlorophenoxy)hexanoyl chloride,
2-(2,3,6-trichlorophenoxy)hexanoyl chloride,
3-(2,4-dichlorophenoxy)hexanoyl chloride,
2-(2,4,5-trichlorophenoxy)-4-methylhexanoyl chloride,
2-(2,5-dichlorophenoxy)heptanoyl chloride,
4-(2,6-dichlorophenoxy)heptanoyl chloride,
2-(3,4-dichlorophenoxy)-3-methylhexanoyl chloride.

As examples of useful heterocyclic substituted alkyl alcohols may be mentioned:
Firstly, the monocyclic, nitrogen hetero atom variety:

2-pyridinemethanol,
α-methyl-4-pyridinemethanol,
3-pyridineethanol,
4-pyridinepropanol,
γ-methyl-2-pyridinepropanol,
α,β-dimethyl-3-pyridineethanol,
2-pyridineisopentanol,
3-pyridinepentanol,
β,γ-dimethyl-3-pyridinebutanol,
β-isopropyl-2-pyridineethanol,
4-pyridineisohexanol,
2-pyrrolemethanol,
α-methyl-3-pyrrolemethanol,
α-methyl-2-pyrroleethanol,
α-methyl-3-pyrrolepropanol,
α-ethyl-2-pyrroleethanol,
3-pyrrolebutanol,
γ-ethyl-3-pyrrolepropanol,
γ-methyl-2-pyrrolepentanol,
β-ethyl-3-pyrrolebutanol,
2-pyrrolehexanol,
3-pyrroleisobutanol,
2-2H-pyrrolemethanol,
α-methyl-3-4H-pyrrolemethanol,
β-methyl-3-2H-pyrroleethanol,
α-methyl-2-4H-pyrrolepropanol,
β-methyl-2-2H-pyrrolepropanol,
α-ethyl-3-4H-pyrroleethanol,
2-4H-pyrrolebutanol,
β,γ-dimethyl-3-2H-pyrrolepropanol,
β-propyl-2-4H-pyrrolepropanol,
3-4H-pyrrolepropanol.

Secondly, the bicyclic, nitrogen hetero atom variety:
3-quinolinemethanol,
α-methyl-4-quinolinemethanol,
2-quinolinemethanol,
γ-methyl-4-quinolinepropanol,
3-quinolineethanol,
α,β-dimethyl-3-quinolineethanol,
α,α-dimethyl-3-quinolineethanol,
2-quinolineisopentanol,
3-quinolinepentanol,
β,γ-dimethyl-3-quinolinebutanol,
β-isopropyl-2-quinolineethanol,
4-quinolineisohexanol,
1-isoquinolinemethanol,
α-methyl-3-isoquinolinemethanol,
4-isoquinolinemethanol,
γ-methyl-1-isoquinolinepropanol,
3-isoquinolineethanol,
α,β-dimethyl-4-isoquinolineethanol,
α,α-dimethyl-1-isoquinolineethanol,
3-isoquinolinepentanol,
4-isoquinolinepentanol,
β,γ-dimethyl-1-isoquinolinebutanol,
β-(isopropyl)-3-isoquinolineethanol,
4-isoquinolinehexanol,
indole-2-methanol,
α-methylindole-3-methanol,
α-methylindole-2-ethanol,
α-methylindole-3-propanol,
α-ethylindole-2-ethanol,
indole-3-butanol,
γ-ethylindole-3-propanol,
γ-methylindole-2-pentanol,
β-ethylindole-3-butanol,
indole-2-hexanol,
indole-3-isobutanol,
2H-indole-2-methanol,
α-methyl-3H-indole-3-methanol,
β-methyl-2H-indole-3-ethanol,
α-methyl-3H-indole-2-propanol,
β-methyl-2H-indole-2-propanol,
α-ethyl-3H-indole-3-ethanol,
3H-indole-2-butanol,
β,γ-dimethyl-2H-indole-3-propanol,
β-propyl-3H-indole-2-propanol,
3H-indole-3-propanol.

Thirdly, the monocyclic, oxygen hetero atom variety:
2-furfuryl alcohol, 3-furamethanol, α-methyl-3-furanethanol, 2-furanpropanol, β-methyl-3-furanethanol, α,γ-dimethyl-2-furanpentanol, 3-furanpentanol, β-propyl-3-furanbutanol, α,β-dimethyl-2-furanethanol, 3-furanhexanol, 2H-pyran-2-methanol, α-methyl-2H-pyran-2-methanol, α-methyl-2H-pyran-3-ethanol, α-methyl-2H-pyran-2-propanol, α-ethyl-2H-pyran-3-ethanol, 2H-pyran-2-butanol, γ-ethyl-2H-pyran-4-propanol, γ-methyl-2H-pyran-2-pentanol, β-ethyl-2H-pyran-2-butanol, 2H-pyran-2-hexanol, 2H-pyran-4-butanol, 4H-pyran-2-methanol, α-methyl-4H-pyran-3-methanol, β-methyl-4H-pyran-2-ethanol, α-methyl-4H-pyran-3-propanol, β-methyl-4H-pyran-2-propanol, α-ethyl-4H-pyran-3-ethanol, 4H-pyran-2-butanol, β,γ-dimethyl-4H-pyran-3-propanol, β-propyl-4H-pyran-2-propanol, 4H-pyran-3-propanol.

Fourthly there is the bicyclic oxygen hetero atom variety: 2-benzofuranmethanol, α-methyl-3-benzofuranmethanolanol, α-methyl-2-benzofuranethanol, α-methyl-3-benzofuranpropanol, α-ethyl-2-benzofuranethanol, 3-benzofuranbutanol, γ-ethyl-2-benzofuranpropanol, γ-methyl-3-benzofuranpentanol, β-ethyl-2-benzofuranbutanol, 3-benzofuranhexanol, 2-benzofuranisobutanol, 1H-2-benzopyran-2-methanol, α-methyl-2H-1-benzopyran-3-methanol, α-methyl-3H-2-benzopyran-4-ethanol, 4H-1-benzopyran-2-propanol, β-methyl-5H-1-benzopyran-3-ethanol, β,γ-dimethyl-1H-2-benzopyran-4-propanol, γ-isopropyl-2H-1-benzopyran-2-hexanol, 4H-1-benzopyran-2-methanol, α-methyl-3H-2-benzopyran-3-methanol, β-methyl-5H-1-benzopyran-4-ethanol, 2H-1-benzopyran-2-butanol, β,γ-dimethyl-1H-2-benzopyran-3-propanol, β-propyl-2H-1-benzopyran-4-propanol, 4H-1-benzopyran-2-propanol.

The foregoing lists are given by way of illustration of the usable class.

The products of the reaction of chlorinated phenoxy monocarboxylic aliphatic acid chlorides with the heterocyclic substituted alkyl alcohols are the corresponding esters of the formula:

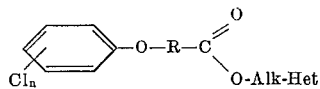

wherein R, "Alk," "Het" and "n" are the same as stated above. Examples of these esters include:

3-(2-pyridyl)propyl 2-(2,4,5-trichlorophenoxy)propionate,
furfuryl 2-(2,4,5-trichlorophenoxy)propionate,
furfuryl (2,4-dichlorophenoxy)acetate,
(2-pyridyl)methyl (2,3-dichlorophenoxy)acetate,
1-(2-pyrrolyl)ethyl 2-(2,3,4-trichlorophenoxy propionate,
2-(2-2H-pyrrolyl)ethyl 3-(2,4-dichlorophenoxy)-3-methylpropionate,
1-(3-quinolyl)-1-methylethyl 4-(2,3,5-trichlorophenoxy)butyrate,
2-(1-isoquinolyl)propyl 3-(2,5-dichlorophenoxy)-3-methylbutyrate,
1-(2-indolyl)propyl 2-(2,3,6-trichlorophenoxy)-3-methylbutyrate,
2-(2-2H-indolyl)propyl 2-(2,6-dichlorophenoxy)valerate,
3-furfurylpropyl 3-(3,4,5-trichlorophenoxy)-4-methylvalerate,
3-(3-methyl-2-furyl)-1-methylpropyl 5-(3,4-dichlorophenoxy)-3-methylvalerate,
2-(2-benzofuranyl)-2-methylpropyl 6-(2,4,6-trichlorophenoxy)hexanoate,
1-(1H-2-benzopyranyl)-2-methylpropyl 5-(3,5-dichlorophenoxy)-5-methylhexanoate,
2-(4-pyridyl)-1-methylpropyl 4-(2,3,4-trichlorophenoxy)-3-methylhexanoate,
1-(3-pyrrolyl)-1-methylpropyl 3-(2,3-dichlorophenoxy)-2-methylhexanoate,
1-(3-4H-pyrrolyl)butyl 7-(2,3,5-trichlorophenoxy)heptanoate,
2-(4-quinolyl)butyl 2-(2,4-dichlorophenoxy)propionate,
3-(3-isoquinolyl)butyl (2,3,6-trichlorophenoxy)acetate,
4-(3-indolyl)butyl 2-(2,5-dichlorophenoxy)propionate,
1-(3-3H-indolyl)-1-methylbutyl 3-(3,4,5-trichlorophenoxy)-2-methylpropionate,
3-furfuryl-2-methylbutyl 4-(2,6-dichlorophenoxy)butyrate,
2-(3-furyl)-3-methylbutyl 3-(2,4,6-trichlorophenoxy)-3-methylbutyrate,
4-(3-benzofuranyl)-4-methylpentyl 2-(3,4-dichlorophenoxy)-2-methylbutyrate,
3-(3-pyridyl)-3-methylbutyl 3-(2,3,5-trichlorophenoxy)-2-methylvalerate,
1-(2-pyrrolyl)hexyl 5-(2,3-dichlorophenoxy)hexanoate,
3-(3-2H-pyrrolyl)-3-methylpentyl 5-(2,3,6-trichlorophenoxy)valerate,
2-(2-quinolyl)-4-methylpentyl 3-(2,3-dichlorophenoxy)-3-methylvalerate,
1-(4-isoquinolyl)-5-hexyl 2-(2,3-trichlorophenoxy)-2-methylvalerate,
5-(2-indolyl)-1-methylpentyl 6-(2,4-dichlorophenoxy)hexanoate,
3-(3-2H-indolyl)-2-methylpentyl 4-(3,4,5-trichlorophenoxy)-5-methylhexanoate,
1-(2-2H-pyranyl)-3-methylpentyl 2-(2,5-dichlorophenoxy)-3-methylhexanoate, 4-(2-4H-pyranyl)-4-methylpentyl 5-(2,4,6-trichlorophenoxy)-2-methylhexanoate,
2-(2-benzofuranyl)hexyl 7-(2,6-dichlorophenoxy)heptanoate,
1-(4-pyridyl)hexyl (2,3,4-trichlorophenoxy)acetate,
2-(3-pyrrolyl)hexyl 3-(3,4-dichlorophenoxy)propionate,
3-(2-4H-pyrrolyl)hexyl 2-(2,3,5-trichlorophenoxy)-2-methylpropionate,
4-(4-quinolyl)hexyl 4-(3,5-dichlorophenoxy)butyrate,
5-(1-isoquinolyl)hexyl 2-(2,3,6-trichlorophenoxy)-3-methylbutyrate 6-(3-indolyl)hexyl 3-(2,3-dichlorophenoxy)-2-methylbutyrate,
2-(2-3H-indolyl)-1,1-dimethylbutyl 2-(3,4,5-trichlorophenoxy)valerate,
4-(3-2H-pyranyl)-2,2-dimethylbutyl 3-(2,4-dichlorophenoxy)-4-methylvalerate,
6-(3-4H-pyranyl)-3,3-dimethylbutyl 4-(2,4-trichlorophenoxy)-3-methylvalerate,
1-(3-benzofuranyl)-4-methylpentyl 2-(2,5-dichlorophenoxy)hexanoate,
3-(2-pyridyl)-1,2-dimethylbutyl 4-(2,4,6-trichlorophenoxy-5-methylhexanoate, 5-2(-pyrrolyl)-1,3-dimethylbutyl 6-(2,6-dichlorophenoxy)-3-methylhexanoate,
1-(2-2H-pyrrolyl)-1-methylpentyl 3-(2,3,4-trichlorophenoxy)-2-methylhexanoate 3-(3-quinolyl-1-methylpentyl 6-(3,4-dichlorophenoxy)heptanoate,
5-(3-isoquinolyl)-2-methylpentyl (2,3,5-trichlorophenoxy)acetate,
2-(2-indolyl-2,3-dimethylbutyl 2-(3,5-dichlorophenoxy)propionate,
4-(2-2H-indolyl)-1,2-dimethylbutyl 3-(2,3,6-trichlorophenoxy)-2-methylpropionate,
2-(2-2H-pyranyl)-1,3-dimethylbutyl 4-(2,3-dichlorophenoxy)butyrate,
1-(2-pyridyl)-2,2-dimethylbutyl 4-(3,4,5-trichlorophenoxy)-3-methylbutyrate,
1-(2-benzofuranyl)-1-methylpropyl 7-(3,4,5-trichlorophenoxy)heptanoate,
1-(3-pyridyl)-2-methylpropyl (2,4,6-trichlorophenoxy)acetate,
1-(3-pyrrolyl)-1,2-dimethylpropyl 2-(2,3-dichlorophenoxy)-propionate,
2-(3-4H-pyrrolyl)-1-methylbutyl (2,3,4-trichlorophenoxy)acetate,
3-(4-quinolyl)-2-methylbutyl 2-(2,4-dichlorophenoxy)propionate,
2-(4-isoquinolyl)-1,1-dimethylpropyl 3-(2,3,5-trichlorophenoxy)-2-methylpropionate,
3-(3-indolyl)-2,2-dimethylpropyl 3-(2,5-dichlorophenoxy)butyrate,
2-(3-3H-indolyl)-3-methylbutyl 4-(2,3-trichlorophenoxy)-3-methylbutyrate,
1-(3-2H-pyranyl)-1-ethylpropyl 2-(3,4-dichlorophenoxy)-2-methylbutyrate,
2-(2-4H-pyranyl)-2-methylbutyl 5-(3,4,5-trichlorophenoxy)valerate,
3-(3-benzofuranyl)hexyl 3-(3,5-dichlorophenoxy)-4-methylvalerate,
3-(2-pyridyl)-1,2-dimethylbutyl 2-(2,4,6-trichlorophenoxy)-3-methylvalerate,
1-(2-pyrrolyl)-1-methylpentyl 5-(2,3-dichlorophenoxy)hexanoate,
2-(2-4H-pyrrolyl)-2-methylbutyl 3-(2,3,4-trichlorophenoxy)-5-methylhexanoate,
3-(3-quinolyl)-2,2-dimethylbutyl 1-(2,4-dichlorophenoxy)-3-methylhexanoate,
1-(1-isoquinolyl)-2-methylbutyl 6-(2,3,5-trichlorophenoxy)-2-methylhexanoate,
1-(2-indolyl)pentyl 2-(2,5-dichlorophenoxy)heptanoate,
2-(2-3H-indolyl)pentyl (2,3,6-trichlorophenoxy)acetate,
3-(2-2H-pyranyl)pentyl 2-(2,6-dichlorophenoxy)propionate,
4-(3,4H-pyranyl)pentyl 3-(3,4,5-trichlorophenoxy)-3-methylpropionate,
5-(3-pyridyl)pentyl 2-(3,4-dichlorophenoxy)butyrate,
5-(3-pyrrolyl)-2-methylpentyl 3-(2,4,6-trichlorophenoxy)-2-methylbutyrate,
4-(3-4H-pyrrolyl)-2-methylpentyl 4-(3,5-dichlorophenoxy)-3-methylbutyrate.

The foregoing list is given by way of illustration only, and in no way limits the scope of the present invention.

In preparing the present compounds, the acylating acid halide agent is simply contacted with the substituted alkyl alcohol. As illustrated by the above equation, equimolar quantities of the two reactants are employed in forming the desired ester, and accordingly it is generally preferred to contact the reactants in approximately equimolecular amounts, although an excess of the more readily available component may be utilized, if desired. The relative proportions of components may be varied for example from one mole of alcohol and two moles of acylating agents to ten moles of alcohol and one mole of acylating agent. Excess reactant can then be removed at the end of the reaction by extraction, distillation, etc.

The esterification reaction proceeds readily at room temperature, but heating may be employed to accelerate the formation of the ester product if desired. Suitable temperatures range from just above the freezing point of the reactants to just below the decomposition temperatures of the reactants and products: for example, temperatures in the range of 0°–250° C. are usually suitable. Generally, the reaction is conducted advantageously at atmospheric pressure, although sub- or super-atmospheric pressures may be employed if desired, for example, to raise or lower the reaction temperature. The method may be adapted to either batch or continuous processes.

Prior, during, or subsequent to contacting the above mentioned reactants, a strong base such as sodium hydroxide, triethylamine or the like may advantageously be added to the reaction mixture to neutralize the HCl which is evolved in the course of the reaction when an acid chloride is used as the acylating agent. An amount of base which is the molar equivalent of the reactant present in the lesser quantity, or of either reactant where equimolar amounts are used, is suitable. The solvent in which the reaction is run may be either inorganic such as liquid ammonia or organic such as benzene. It may have a high dielectric constant (above 20, where a vacuum =1) such as nitrobenzene, water, nitroethane, acetone, and nitrotoluene, or a low dielectric constant (20 or below) such as carbon tetrachloride, benzene, chlorobenzene, tetranitromethane, dibromoethane, chloromethane, chloroform, methylamine, dimethylamine, propane, pyridine, pentane, propyl ether, toluene, and heptane.

The isolation of the product may be accomplished by any general standard procedure, such as distillation, extraction, and crystallization.

The heterocyclic substituted alkyl esters of the aryloxy aliphatic acids are useful for a variety of chemical and agricultural purposes. They are useful as biological toxicants and they are particularly valuable as defoliants and are also active as insecticides, fungicides, microbiological agents, and herbicides.

The invention is further illustrated, but not limited, by the following examples.

EXAMPLE 1

54 grams (g.) of 2-(2,3,5-trichlorophenoxy)propionyl chloride in 50 milliliters (ml.) of benzene is added gradually with stirring to 25.7 g. of 2-pyridinepropanol dissolved in 100 ml. of benzene. An exothermic reaction takes place and a granular solid begins to appear immediately upon the addition of the acid chloride; 18.8 g. of triethylamine is then added to the reaction mixture.

When the addition of the acid chloride is complete, the reaction mixture is heated to a gentle reflux for an hour. When cold, the reaction mixture is filtered to separate the triethylamine hydrochloride salt from the desired product.

The filtrate is evaporated down under vacuum to yield 72.3 g. of a brown oil. It is dissolved in dilute aqueous HCl and extracted with ether and benzene. The aqueous solution is then neutralized with dilute aqueous NaOH, and the oil which separates is extracted with benzene and evaporated to dryness leaving a brown oil which on standing crystallizes. The resulting tan solid is recrystallized from an ethanol-water solution. The product is 2-(2-pyridyl)propyl 2-(2,4,5-trichlorophenoxy)propionate. Its melting point is 38–40.5° C. and its structure is confirmed by its infrared spectrum. The compound analyzes as follows.—Calcd. for $C_{17}H_{16}Cl_3NO_3$: C, 52.5; H, 4.1; N, 3.6%. Found: C, 52.2; H, 4.1; N, 3.8%.

EXAMPLE 2

1.5 g. of sodium hydroxide is dissolved in 100 ml. of water. 10.8 g. of 2-(2,4,5-trichlorophenoxy)propionyl chloride and 3.7 g. of furfuryl alcohol are added to the aqueous solution which is then vigorously stirred for four hours. The solid is then removed by filtration and purified by recrystallization from an ethanol-water solution to give furfuryl 2-(2,4,5-trichlorophenoxy)propionate, a pale tan powder which has a melting point of 55.5–56.5° C. Calcd. for $C_{14}H_{11}Cl_3O_4$: C, 45.4; H, 3.2; Cl, 30.0%. Found: C, 45.1; H, 3.2; Cl, 30.4%.

EXAMPLE 3

1.5 g. of sodium hydroxide is dissolved in 100 ml. of water. 9.1 g. of (2,4-dichlorophenoxy)acetyl chloride and 3.7 g. of furfuryl alcohol are added to the aqueous solution which is then vigorously stirred for four hours. The solid is then removed by filtration and purified by recrystallization from ethanol-water to give furfuryl (2,4-dichlorophenoxy)acetate.

The compounds of this invention may be used as biological toxicants. In order to use them effectively on plants or insects it is often desirable to mix them with an inert carrier as only a small dose of the compounds of this invention is needed for effective toxicant action. The carrier may be such substances as inert diluents, dusts and oils. It is often desirable to use a dispersing agent such as a surfactant to get the compounds of the invention into the carrier in such varied forms as solutions, suspensions or mixtures.

This invention is not limited in its broad aspects to any particular dispersing agent, or combination of such agents. Nor is the invention in its broad aspects limited to agents of either the ionic type, such as hydrochloric acid or ammonium hydroxide, or the non-ionic type, such as sulphonated castor oil, peanut oil, soy oil, soaps—for instance—sodium laurate, polyglycol monoethers with long chain fatty alcohols and excess ethylene oxide, although, in general, the non-ionic type is more effective.

The use of the present invention as biological toxicants is further illustrated, but not limited, by the folowing examples:

EXAMPLE 4

A defoliant composition containing 3-(2-pyridyl)-propyl 2-(2,4,5-trichlorophenoxy)propionate as the active agent is prepared by adding to 1.5 cc. of 2% active solution of the compound of the invention, 0.2 cc. of a solution consisting of 3 parts of cyclohexanone and 1 part of "Emulsifier-L," a polyalkylene glycol ether-long-chain alkylbenzene sulfonate. 4.5 cc. of water is then added. The mixture is then diluted with water to give a concentration when sprayed of 3 lbs. of compound per acre when 10 gallons of solution are used per acre. The liquid is then sprayed on a young potted euonymous tree by means of a nozzle jet while the plant is moved under the spray by means of a conveyor belt. At the end of ten days there is 100% defoliation.

EXAMPLE 5

A spray containing furfuryl 2-[2,4,5-trichlorophenoxy]propionate is prepared and applied in a manner similar to that in Example 4. It produces 90% defoliation of euonymous in 14 days.

Likewise the compounds of this invention are useful as herbicides. For example, 3-(2-pyridyl)propyl 2-(2,4,5-trichlorophenoxy)propionate kills bindweed when prepared as described above for spraying and applied at a rate of 10 lbs./acre.

While the invention has been described with particular reference to various preferred embodiments thereof, other variations in the constituent compounds, the methods of preparing same, the compositions, and uses of this invention may be readily made by those skilled in the art and it will be appreciated that numerous modifications and variations are possible without departure from the spirit and scope of the invention. Therefore, the invention is not intended to be limited except as indicated in the appended claims.

What is claimed is:

1. A method for defoliating plant life which consists in applying to said plant life an active amount of a composition of the formula

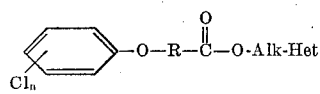

in which $n$ is an integer of from 2 to 3, R is a saturated aliphatic hydrocarbon chain of from 1 to 6 carbon atoms, "Alk" is a saturated aliphatic hydrocarbon chain of from 1 to 6 carbon atoms and "Het" is an aromatic heterocyclic ring system chosen from the group consisting of pyridine, furan, lower alkyl substituted pyridines and lower alkyl substituted furans.

2. The method of claim 6 in which said composition contains an inert carrier.

3. The method of claim 6 in which said composition contains an inert carrier and a dispersing agent.

4. A method for defoliating plants which consists in applying to the plant the composition of claim 3.

5. A method for defoliating plants which consists in applying to the plant an active amount of a composition containing 3-(2-pyridyl)propyl 2-(2,4,5-trichlorophenoxy)propionate, an inert carrier and a dispersing agent.

6. A method for defoliating plants which consists in applying to the plant an active amount of a composition containing furfuryl 2-(2,4,5-trichlorophenoxy)propionate, an inert carrier and a dispersing agent.

7. A defoliating compositon which is comprised of an inert carrier and an active amount of a compound of the following formula:

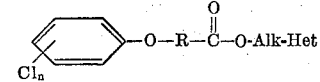

wherein $n$ is an integer of from 2 to 3, R is a saturated aliphatic hydrocarbon chain of from 1 to 6 carbon atoms, "Alk" is a saturated aliphatic hydrocarbon chain of from 1 to 6 carbon atoms, and "Het" is an aromatic heterocyclic ring system chosen from the group consisting of pyridine, furan, lower alkyl substituted pyridines and lower alkyl substituted furans.

8. A method for killing plant life which consists in applying to said plant life a toxic amount of a composition of the formula:

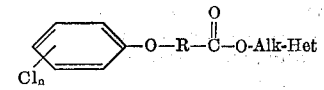

in which $n$ is an integer of from 2 to 3, R is a saturated aliphatic hydrocarbon chain of from 1 to 6 carbon atoms, "Alk" is a saturated aliphatic hydrocarbon chain of from 1 to 6 carbon atoms, and "Het" is an aromatic heterocyclic ring system chosen from the group consisting of pyridine, furan, lower alkyl substituted pyridines and lower alkyl substituted furans.

9. A herbicidal composition which is comprised of an inert carrier and a toxic amount of a compound of the following formula:

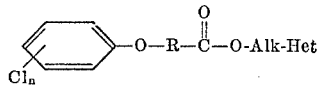

wherein $n$ is an integer of from 2 to 3, R is a saturated aliphatic hydrocarbon chain of from 1 to 6 carbon atoms, "Alk" is a saturated aliphatic hydrocarbon chain of from 1 to 6 carbon atoms, and "Het" is an aromatic heterocyclic ring system chosen from the group consisting of pyridine, furan, lower alkyl substituted pyridines and lower alkyl substituted furans.

References Cited

UNITED STATES PATENTS

| 2,704,291 | 3/1955 | Kohn | 71—88 |
| 2,728,653 | 12/1955 | Scott | 71—88 |
| 2,732,291 | 1/1956 | Davie | 71—88 X |

JAMES O. THOMAS, JR., *Primary Examiner.*